United States Patent
Lundberg et al.

(10) Patent No.: US 10,697,678 B2
(45) Date of Patent: Jun. 30, 2020

(54) QUICK-CONNECT SYSTEM FOR A HIGH PRESSURE CONNECTION

(71) Applicants: Bosch Automotive Service Solutions Inc., Warren, MI (US); Robert Bosch GmbH, Stuttgart (DE)

(72) Inventors: Dylan M. Lundberg, Lonsdale, MN (US); Garth H. Saul, Faribault, MN (US)

(73) Assignees: Bosch Automotive Service Solutions, Inc., Warren, MI (US); Robert Bosch GmbH, Stuttgart (DE)

( * ) Notice: Subject to any disclaimer, the term of this patent is extended or adjusted under 35 U.S.C. 154(b) by 1173 days.

(21) Appl. No.: 14/966,207

(22) Filed: Dec. 11, 2015

(65) Prior Publication Data
US 2016/0169570 A1    Jun. 16, 2016

Related U.S. Application Data

(60) Provisional application No. 62/091,675, filed on Dec. 15, 2014.

(51) Int. Cl.
  *F16L 37/04*    (2006.01)
  *F16L 37/092*   (2006.01)
  *F25B 45/00*    (2006.01)

(52) U.S. Cl.
  CPC .............. *F25B 45/00* (2013.01); *F16L 37/04* (2013.01); *F16L 37/0925* (2013.01); *F16L 37/0927* (2019.08)

(58) Field of Classification Search
  CPC ....... F16L 37/04; F16L 37/0925; F16L 3/105; F16L 5/027; F16L 17/02; F16L 19/06;
  (Continued)

(56) References Cited

U.S. PATENT DOCUMENTS 3,743,326 A * 7/1973 Courtot .................. F16L 33/16
                                                        285/105
4,005,883 A * 2/1977 Guest .................. F16L 37/0845
                                                        285/322
(Continued)

FOREIGN PATENT DOCUMENTS

DE         30 18 077     12/1980
DE     10 2006 062 238    6/2008
GB          2245671       1/1992

OTHER PUBLICATIONS

European Search Report corresponding to European Application No. 15 200 096.4 (8 pages).

*Primary Examiner* — Zachary T Dragicevich
*Assistant Examiner* — William S. Choi
(74) *Attorney, Agent, or Firm* — Maginot, Moore & Beck LLP

(57) ABSTRACT

A quick-connect system for a high pressure connection includes a port and a collet. The port defines an inlet opening at an outer longitudinal end of the port and includes an inner wall having a first sloped surface at least partially defining a collet cavity. The first sloped surface has a first diameter at a first end nearest the inlet opening and a second diameter, which is greater than the first diameter, at a second end opposite the first end. The collet includes a head portion and a plurality of legs extending distally from the head portion, and each leg of the plurality of legs includes a distal foot portion. In a connected state, the foot portions of the plurality of legs are located in the collet cavity, and the foot portions define an outermost diameter that is greater than the first diameter.

17 Claims, 8 Drawing Sheets

(58) Field of Classification Search
CPC ..... F16L 33/025; F16L 33/035; F16L 37/091;
F16L 37/098; F16L 37/12; F16L 37/092;
F16L 37/0987; F16L 21/06; F25B 45/00
USPC .... 285/148.28, 33, 148.21, 148.2, 309, 322,
285/323, 339, 345, 34, 324, 307
See application file for complete search history.

(56) References Cited

U.S. PATENT DOCUMENTS

| | | | | |
|---|---|---|---|---|
| 4,083,586 A | * | 4/1978 | Helm | F16L 37/0925 285/105 |
| 4,951,391 A | * | 8/1990 | Seabra | B23P 13/02 29/558 |
| 5,171,045 A | * | 12/1992 | Pasbrig | F16L 33/227 285/308 |
| 5,401,064 A | * | 3/1995 | Guest | F16L 37/0925 285/123.1 |
| 5,885,450 A | | 3/1999 | Reid | |
| 5,909,902 A | * | 6/1999 | Seabra | F16L 37/0925 285/322 |
| 6,145,894 A | * | 11/2000 | Myers | B60G 11/58 267/64.24 |
| 6,173,999 B1 | * | 1/2001 | Guest | F16L 37/091 285/323 |
| 8,025,318 B1 | * | 9/2011 | Morroney | F16L 37/0925 285/322 |
| 8,403,370 B2 | * | 3/2013 | Choi | F16K 27/065 137/862 |
| 2005/0127114 A1 | * | 6/2005 | Parrish | F16L 37/0925 222/402.1 |
| 2005/0275221 A1 | * | 12/2005 | Rehder | F16L 37/091 285/307 |
| 2006/0226651 A1 | * | 10/2006 | Griswold | F16L 37/0925 285/322 |
| 2011/0079999 A1 | * | 4/2011 | LeQuere | F16L 37/0925 285/24 |
| 2012/0104749 A1 | * | 5/2012 | Kang | F16L 37/0925 285/323 |
| 2013/0320667 A1 | * | 12/2013 | Cai | F16L 37/0925 285/133.21 |
| 2015/0102598 A1 | * | 4/2015 | Guest | F16L 37/0925 285/322 |

* cited by examiner

QUICK-CONNECT SYSTEM FOR A HIGH PRESSURE CONNECTION

CROSS-REFERENCE TO RELATED APPLICATION

This application claims priority to U.S. Provisional Application Ser. No. 62/091,675 entitled "Method and System of Quick Connection and Detachment Between Manifold Blocks and Componentry," filed Dec. 15, 2014, the disclosure of which is hereby incorporated herein by reference in its entirety.

TECHNICAL FIELD

The disclosure relates to tube connection systems, and more particularly to high-pressure quick-connect tube connection systems.

BACKGROUND

Air conditioning systems are currently commonplace in homes, office buildings and a variety of vehicles including, for example, automobiles. Over time, the refrigerant included in these systems becomes depleted and/or contaminated. As such, in order to maintain the overall efficiency and efficacy of an air conditioning system, the refrigerant included therein may be periodically replaced or recharged.

Portable carts, also known as recover, recycle, recharge ("RRR") refrigerant service carts or air conditioning service ("ACS") systems, are used in connection with servicing refrigeration circuits, such as the air conditioning unit of a vehicle. The portable machines include hoses coupled to the refrigeration circuit to be serviced. A vacuum pump, compressor, and a series of valves operate to recover refrigerant from the vehicle's air conditioning unit, flush the refrigerant, and subsequently recharge the system from a supply of either recovered refrigerant and/or new refrigerant from a refrigerant tank.

Each ACS unit includes many tube and/or hose assemblies which interconnect a manifold block and various other components. A vast majority of the tube and hose assemblies are connected to the manifold block and various other components with some variation of a female nut and a mating male fitting. Installation of each connection often requires an open-face wrench to tighten the female nut until a requisite torque specification is achieved. Although the female nut and mating male fitting often yield sufficient performance in the presence of the high pressure fluids in the system, the time required to assemble the female nut and mating male fitting results in increased manufacturing and maintenance time. In some instances, the assembly time of each tube or hose end has been is estimated to be in excess of fifteen seconds, which, when summed among all the fittings in the ACS unit, contributes to manufacturing time and labor cost.

Certain "quick-connect" fittings are utilized in the pneumatic field to reduce the time required to connect various tubes and hoses. One such fitting 10 is depicted in FIG. 1, and includes a body 12 having external threads 14 for connection to a manifold (not shown) or some other receiving structure, and defines an internal passage 16. A collet 18 is positioned within one end of the body 12 in the passage 16, and includes teeth 20 configured to engage the outer surface of a tube or hose (not shown). A sealing O-ring 22 is positioned in the passage 16 of the body 12, and is separated from the collet 18 by a plastic back ring 24.

In order to connect a tube or hose (not shown) with the fitting 10, the tube or hose is inserted through an end opening 26, which is defined in the collet 18, until the tube or hose protrudes far enough into the passage 16 that the end of the tube or hose contacts a step 28 of the body 12. The plastic back ring 24 engages an outer surface of the teeth 20 of the collet 18 to maintain the teeth 20 in pressing engagement with the outer surface of the tube or hose, thereby providing a holding force sufficient to hold the tube in place.

If the tube or hose is pulled, the back ring 24 cooperates with the outer surface of the teeth 20 to press the teeth inward, thereby providing an increase in the holding force sufficient to prevent the tube or hose from being pulled out of the passage 16. In order to remove tube or hose, the collet 18 is pressed until an end face 30 of the collet 18 contacts an end face 32 of the body 12. Pressing the collet 18 moves the teeth to a position in which the outer surface of the teeth 20 can no longer engage the plastic back ring 24, allowing the tube or hose to be freely pulled out of the passage 16 without the teeth pressing inward on the tube or hose.

Although previous quick-connect fittings, such as the fitting 10, provide for connecting and removal of the tube or hose in a timely manner, the fittings are not intended for high-pressure applications such as those encountered in ACS units. Previous quick-connect fittings are rated for pressures well under 1000 psi, while ACS units often require fittings capable of withstanding pressures in excess of 2500 psi.

In high-pressure applications, for example, the quick-connect fitting 10 fails due to the high-pressure on the back end of the O-ring 22 forcing the O-ring 22 to press against the teeth 20 of the collet 18. By pressing against the teeth 20 of the collet 18, the O-ring 22 may tear, causing leaks, or the collet 18 may buckle, causing the tube to release violently from the fitting. Moreover, since the plastic back-ring 24 is not fluid-tight and is not capable of withstanding the high-pressures of an ACS unit, the mere presence of the back ring 24 does not eliminate the problems of the prior art quick-connect fitting 10.

A connection system for connecting tube and hose assemblies that withstands high-pressure performance requirements and reduces assembly time is therefore desirable.

SUMMARY

A quick-connect system for a high pressure connection comprises a port and a collet. The port defines an inlet opening at an outer longitudinal end of the port and includes an inner wall having a first sloped surface at least partially defining a collet cavity. The first sloped surface has a first diameter at a first end nearest the inlet opening and a second diameter, which is greater than the first diameter, at a second end opposite the first end. The collet includes a head portion and a plurality of legs extending distally from the head portion, and each leg of the plurality of legs includes a distal foot portion. In a connected state, the foot portions of the plurality of legs are located in the collet cavity, and the foot portions define an outermost diameter that is greater than the first diameter.

In one embodiment the quick-connect system further comprises a tube inserted in the collet in the connected state. A maximum width of the foot portion of each leg in a radial direction is greater than a minimum distance between an outer diameter of the tube and the first end of the first sloped portion.

In some embodiments, the foot portion of each leg includes a retaining element configured to engage a tube positioned in the collet.

In another embodiment, of the quick-connect system, the foot portion of each leg includes a first foot sloping surface which slopes outwardly from a distal portion of the first foot sloping surface to a proximal portion of the first foot sloping surface. The first foot sloping surface is configured to engage the first sloped surface as the collet is moved longitudinally outwardly from the connected state so as to urge the retaining element of each leg radially inwardly.

In yet another embodiment, the inner wall further comprises a second sloped surface extending from the outer longitudinal end of the port toward the first sloped surface, and a first cylindrical portion extending longitudinally from the second sloped surface to the first end of the first sloped surface.

In further embodiments of the quick-connect system, the foot portion of each leg includes a second foot sloping surface which slopes inwardly from a distal portion of the second foot sloping surface to a proximal portion of the second foot sloping surface. The second foot sloping surface cooperates with the second sloped surface of the inner wall when the collet is inserted into the inlet opening so as to deform the plurality of legs radially inwardly.

In one embodiment, the quick-connect system further comprises a sealing element positioned in the port and configured to seal between the inner wall and a tube positioned in the port. The port includes a projection projecting radially inwardly from the inner wall, the projection interposed between the sealing element and the collet cavity.

In one particular embodiment, the projection has an inner diameter that substantially corresponds to an outer diameter of the tube.

In another embodiment, the port includes a tube stop face longitudinally inwardly of the sealing element and configured to engage a terminal end face of the tube.

In a further embodiment according to the disclosure, an air conditioning service system comprises a manifold block including a port defining an inlet opening at an outer longitudinal end of the port and including an inner wall having a first sloped surface at least partially defining a collet cavity. The first sloped surface has a first diameter at a first end nearest the inlet opening and a second diameter, which is greater than the first diameter, at a second end opposite the first end. The air conditioning service system further comprises a collet including a head portion and a plurality of legs extending distally from the head portion, and each leg of the plurality of legs includes a distal foot portion. A tube is inserted in the collet and connected to the port of the manifold block. In a connected state, the foot portions of the plurality of legs are located in the collet cavity, and the foot portions define an outermost diameter that is greater than the first diameter.

In some embodiments of the air conditioning service system, a maximum width of the foot portion of each leg in a radial direction is greater than a minimum distance between an outer diameter of the tube and the first end of the first sloped portion.

In another embodiment of the air conditioning service system, the foot portion of each leg includes a retaining element configured to engage the tube.

In one embodiment, the foot portion of each leg includes a first foot sloping surface which slopes outwardly from a distal portion of the first foot sloping surface to a proximal portion of the first foot sloping surface. The first foot sloping surface is configured to engage the first sloped surface as the collet is moved longitudinally outwardly from the connected state so as to urge the retaining element of each leg radially inwardly.

In yet another embodiment of the air conditioning service system, a sealing element is positioned in the port and is configured to seal between the inner wall and the tube. The port includes a projection projecting radially inwardly from the inner wall, and the projection is interposed between the sealing element and the collet cavity.

In further embodiments, the projection has an inner diameter that substantially corresponds to an outer diameter of the tube.

In another embodiment according to the disclosure, an air conditioning service system comprises a manifold block and a tube connected to the manifold block via a quick-connect system. The quick-connect system comprises a port defining an inlet opening at an outer longitudinal end of the port and including an inner wall having a first sloped surface at least partially defining a collet cavity. The first sloped surface has a first diameter at a first end nearest the inlet opening and a second diameter, which is greater than the first diameter, at a second end opposite the first end. The quick-connect system further comprises a collet including a head portion and a plurality of legs extending distally from the head portion, and each leg of the plurality of legs includes a distal foot portion. In a connected state, the foot portions of the plurality of legs are located in the collet cavity, and the foot portions define an outermost diameter that is greater than the first diameter.

In one embodiment, a maximum width of the foot portion of each leg in a radial direction is greater than a minimum distance between an outer diameter of the tube and the first end of the first sloped portion.

In some embodiments, the foot portion of each leg includes a retaining element configured to engage the tube and a first foot sloping surface which slopes outwardly from a distal portion of the first foot sloping surface to a proximal portion of the first foot sloping surface. The first foot sloping surface is configured to engage the first sloped surface as the collet is moved longitudinally outwardly from the connected state so as to urge the retaining element of each leg radially inwardly.

In another embodiment of the air conditioning service system, the quick-connect system includes a sealing element positioned in the port and configured to seal between the inner wall and the tube. The port includes a projection projecting radially inwardly from the inner wall, and the projection is interposed between the sealing element and the collet cavity.

In one embodiment, of the air conditioning service system, the projection has an inner diameter that substantially corresponds to an outer diameter of the tube.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
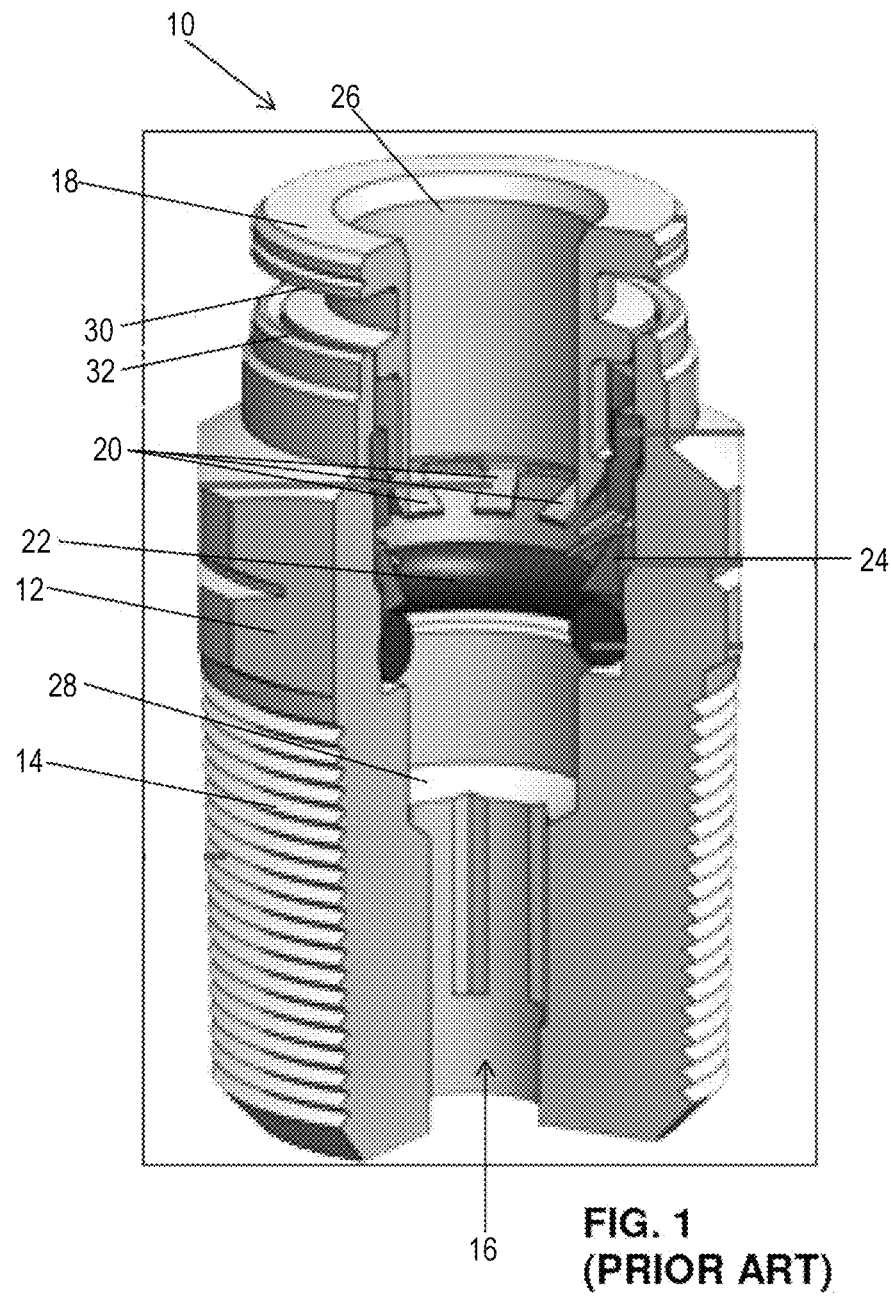
FIG. 1 is a partial-cutaway perspective view of a conventional quick-connect fitting.
Figure 2:
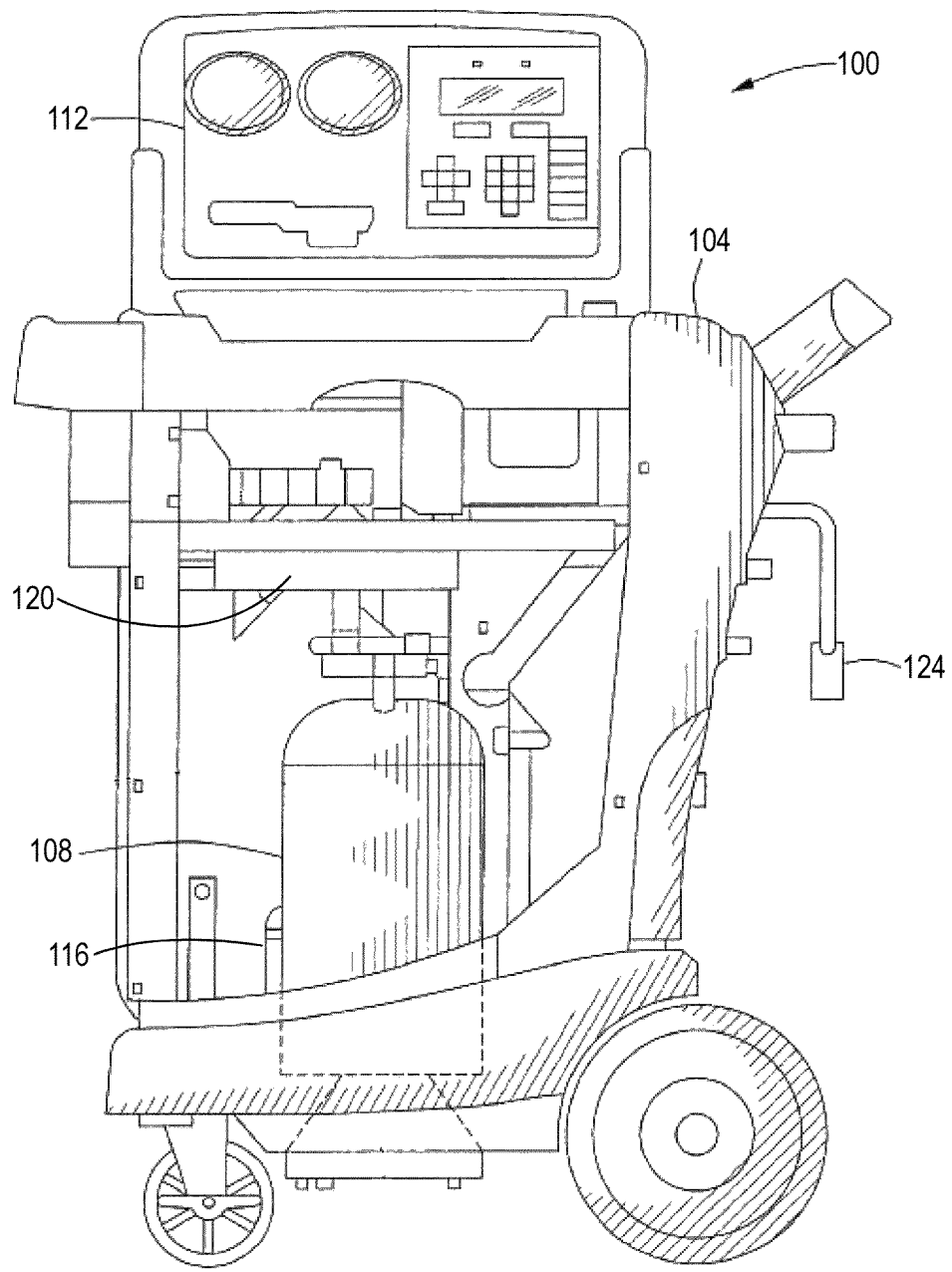
FIG. 2 is a perspective view of an ACS system utilizing an embodiment of a quick-connect system.

FIG. 2 is an illustration of an air conditioning service ("ACS") system 100. The ACS system 100 includes a housing 104 in which a refrigerant container or internal storage vessel ("ISV") 108, a controller 112, a compressor 116, and one or more manifold blocks (only the lower manifold block 120 is visible in FIG. 1). Hose connections 124 (only one is shown in FIG. 2) protrude from the housing 104 to connect to an A/C system and facilitate transfer of refrigerant to and from the ACS system 100.

The ISV 108 is configured to store refrigerant for the ACS system 100. No limitations are placed on the kind of refrigerant that may be used in the ACS system. As such, the ISV 108 is configured to accommodate any refrigerant that is desired to be collected. In some embodiments, the ISV 108 is particularly configured to accommodate refrigerants that are commonly used in the A/C systems of vehicles (e.g., cars, trucks, boats, planes, etc.), for example R-134a, $CO_2$, or R1234yf. In some embodiments, the ACS system has multiple ISV tanks configured to store different refrigerants. Each independent ISV in one embodiment includes a separate scale and temperature sensor. In other embodiments, the independent ISV tanks are all weighed by a single ISV scale.

Figure 3:
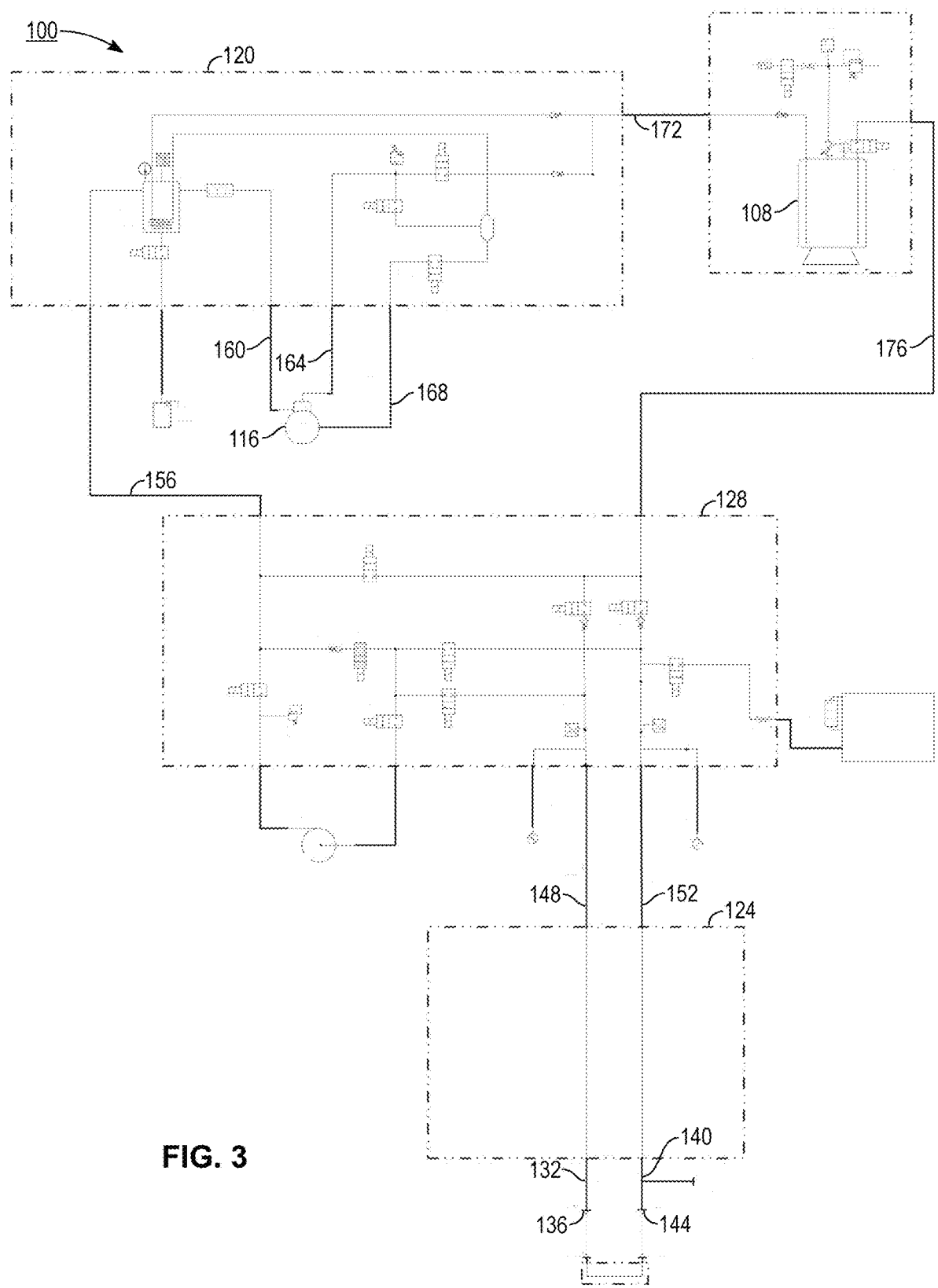
FIG. 3 is a schematic view of the control components of the ACS machine of FIG. 2.

Further details of the ACS system 100 are described with reference to FIG. 3, which is a schematic diagram of the ACS system 100 of FIG. 2. FIG. 3 depicts a bulkhead manifold 124, a top manifold 128, the lower manifold 120, and the ISV 108 of the ACS system 100. The bulkhead manifold 124 has a high-side service hose 132 with a high-side coupler 136 and a low-side service hose 140 with a low-side coupler 144. The high-side and low-side service hoses 132, 140, respectively, are configured to attach to high-side and low-side service ports of an air conditioning system, and each of the service hoses 132, 140 is connected to a respective hose connection 114 (FIG. 1). The bulkhead manifold 124 routes the high-side service hose 132 to a high-side bulkhead hose 148 and the low-side service hose 140 to a low-side bulkhead hose 152. The high-side and low-side bulkhead hoses 148, 152 each connect the bulkhead manifold 124 to the top manifold 128.

The top manifold 128 and the lower manifold 120 include various valves, conduits, and other components used in refrigerant recovery and recharge operations. The top manifold 128 is connected to the lower manifold 120 by a manifold connection tube 156, which is configured to carry high pressure refrigerant between the top manifold 128 and the lower manifold 120. In addition, the lower manifold connects to a compressor suction tube 160, which connects to the suction side of the compressor 116, a compressor discharge tube 164, which connects to the high-pressure side of the compressor 116, and a compressor oil return tube 168, which connects to an oil return side of the compressor 116. A tank vapor hose 172 fluidly connects the lower manifold 120 to the ISV tank 108 to transfer recovered and compressed refrigerant vapor to the ISV tank 108, while a charge line 176 fluidly connects the ISV tank 108 to the top manifold 128 to transfer refrigerant through a charge circuit back and into the air conditioning system.

Figure 4:
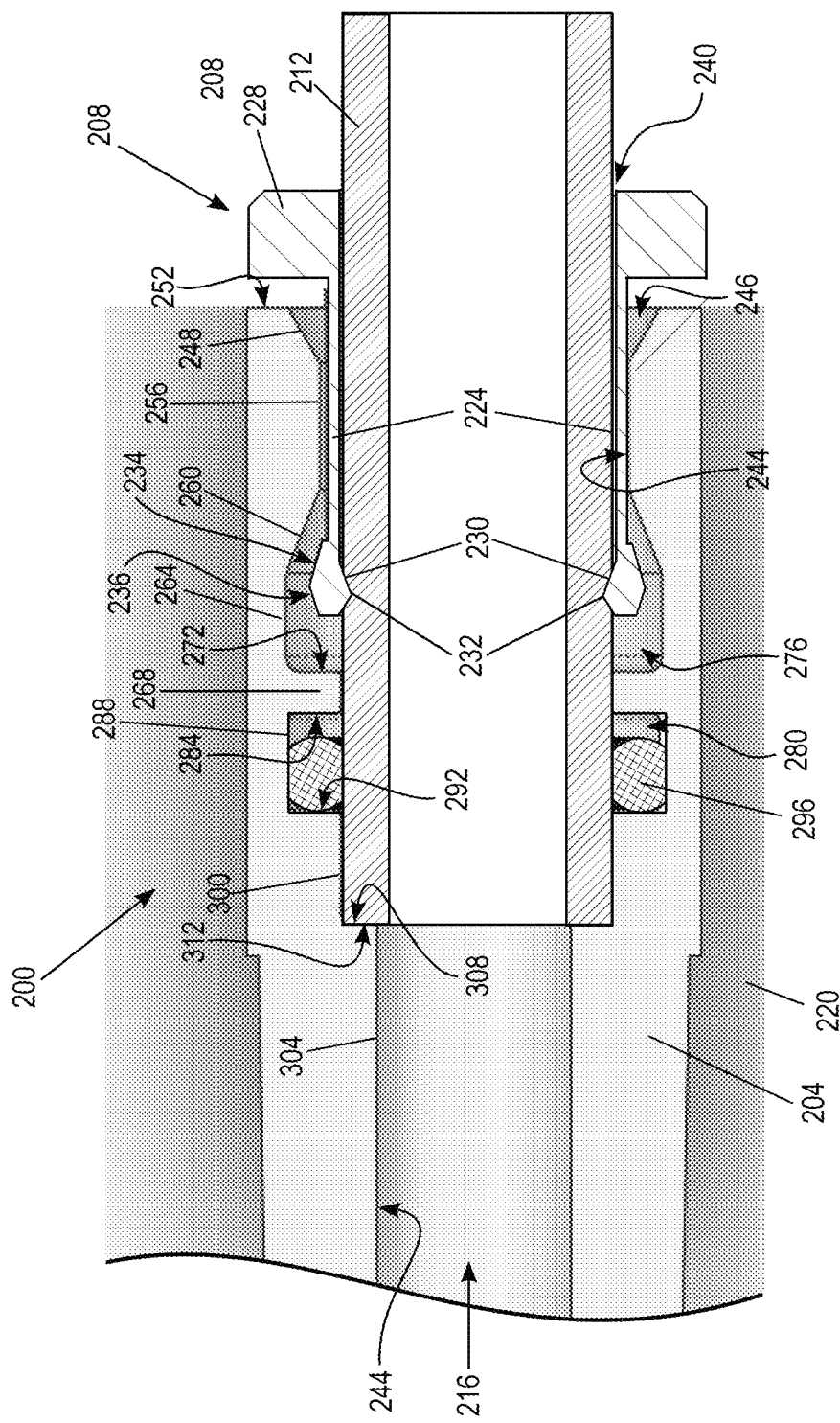
FIG. 4 is a cross-sectional view of an embodiment of a quick-connect system.
Figure 5:
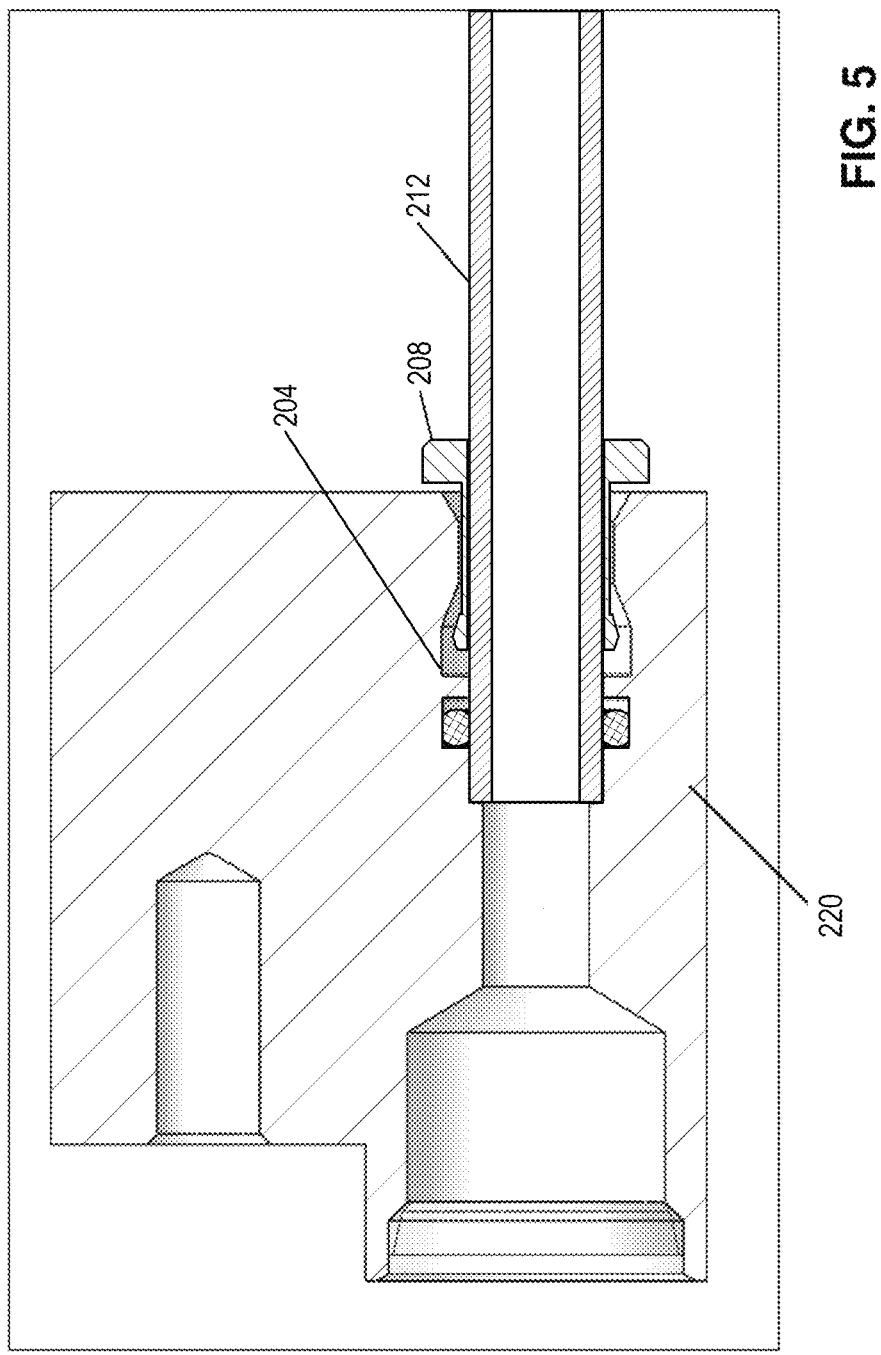
FIG. 5 is a cross-sectional view of the quick-connect system of FIG. 2 showing the port embodied in a manifold block

In various embodiments, some or all of the tubes and hoses 132, 140, 148, 152, 156, 160, 164, 168, 172, 176 are fluidly coupled to the associated manifold 120, 124, 128 and/or the ISV 108 with a quick-connect system 200, depicted in FIG. 4. The quick-connect system 200 includes a port 204 and a collet 208 configured to selectively secure a tube 212, which is, for example, the manifold connection tube 156, to a passage 216 defined through the port 204. In the embodiment shown, the port 204 is integrally formed in the manifold block 220 and is, for example, machined directly into the manifold block 220, which is, in this example, the lower manifold block 120. In other embodiments, the port 204 is a separate component inserted into the manifold block 220.

While reference is made in this illustration to the manifold connection tube 156 connecting to the lower manifold 120, the reader should appreciate that, in various embodiments, the quick-connect system 200 is implemented as any or all of the connections between the hoses or tubes 132, 140, 148, 152, 156, 160, 164, 168, 172, 176 with an associated manifold 120, 124, 128 or other component of the ACS system 100, for example the ISV 108. In one embodiment, for example, the manifold connection tube 156 is connected to the upper manifold 128 with the quick-connect system 200. In other embodiments, for example, each of the tubes 132, 140, 148, 152, 156, 160, 164, 168, 172, 176 are connected to a respective manifold 120, 124, 128 with the quick-connect system 200.

Moreover, while the port 204 is shown as machined directly into the manifold 220 of the ACS system 100, in other embodiments, the port 204 is machined into a manifold of another RRR cart or ACS system. In yet other embodiments, instead of being machined directly into a manifold, the port 204 is instead housed in a standalone fitting that can be secured to a manifold or other receiving element. In one specific embodiment of a standalone fitting, the port is embodied with an externally machined straight hex fitting, while in another embodiment, the standalone fitting is an elbow, such as a brass elbow.

Referring back to FIG. 4, the collet 208 includes a plurality of circumferentially spaced flexible legs 224 (two are shown in FIG. 4) extending axially, or distally, from a head 228 of the collet 208. The end of each flexible leg 224 opposite the head 228 includes a foot 230 having a retaining element 232 configured to engage the surface of the tube 212. In some embodiments, the retaining elements 232 are formed as teeth. An outer surface of the foot 230 includes an outwardly sloped surface 234 and an inwardly sloped surface 232. The outwardly sloped surface 234 slopes outwardly in a direction from the head 228 toward the end of the legs 224 (i.e. slopes outwardly from a proximal end of the outwardly sloped surface 234 to a distal end of the outwardly sloped surface 234), while the inwardly sloped surface 236 slopes inwardly from the end of the outwardly sloped surface 234 toward the end of the legs 224 (i.e. slopes inwardly from a proximal end of the inwardly sloped surface 236 to a distal end of the inwardly sloped surface 236). The head 228 and the legs 224 define a passage 240 sized to accommodate the tube 212. The legs 224 are inserted into the passage 216 of the port 204, as explained in detail below.

With continued reference to FIG. 4, the passage 216 is defined by an inner surface 244 of the port 204, which extends inwardly from an inlet opening 246 of the port. The inner surface 244 includes a sloped inlet wall portion 248 that is sloped or slanted radially inwardly from an inlet face 252, which surrounds the inlet opening 246, to a first through wall portion 256. The through wall portion 256 in the embodiment shown extends longitudinally along the passage 216 to a sloped interior wall portion 260. The outer surfaces of the main portion of the two legs 224 of the collet 228 located radially opposite each other, as illustrated in FIG. 4, have a diameter that is less than, or approximately equal to, the diameter of the first through wall portion 256. However, the outer surfaces of the two feet 230 of the respective legs 224 shown define a diameter that is greater than the diameter of the first through wall portion 256. As will be discussed in detail below, this arrangement facilitates locking the legs 224 within the port 204.

The sloped interior wall portion 260 is sloped or slanted radially outwardly from the first through wall portion 256 to a second through wall portion 264. The port 204 includes a projection 268 extending inwardly at the end of the second through wall portion 264 opposite the sloped interior wall portion 260 such that the second through wall portion 264 extends longitudinally to a front face 272 of the projection 268. The portion of the passage 216 extending from the inlet face 252 to the front face 272 of the projection 268 defines a collet cavity 276 in which the legs 224 of the collet 208 are received.

The inner surface 244 of the port 204 continues inwardly into the port 204 and defines a seal notch 280 bounded by the rear face 284 of the projection 268, an outer face 288 of the inner surface 244, and a rear circumferential face 292 of the inner surface 244. The notch 280 is sized to accommodate a sealing element 296. In the embodiment shown, the sealing element 296 is an elastic O-ring formed of rubber or another desired elastomer. In other embodiments, the sealing element 296 is another desired seal or gasket. The inner and outer diameters of the sealing element 296 and the outer diameter of the tube 212 are selected such that the sealing element 296 provides a desired compression against tube 212 when the tube 212 is inserted into the port 204 in order to achieve a fluid-tight seal between the inner surface 244 of the port 204 and the outer surface of the tube 212.

With continued reference to FIG. 4, the inner surface 244 of the port 204 continues inwardly into the port 204 to define a longitudinally extending rear portion 300 and a through portion 304. In the embodiment shown, the diameter of the longitudinally extending rear portion 300 is larger than the diameter of the through portion 304 to form a step that defines a tube stop face 308. When the tube 212 is installed, an end face 312 of the tube 212 engages the tube stop face 308.

Figure 6:
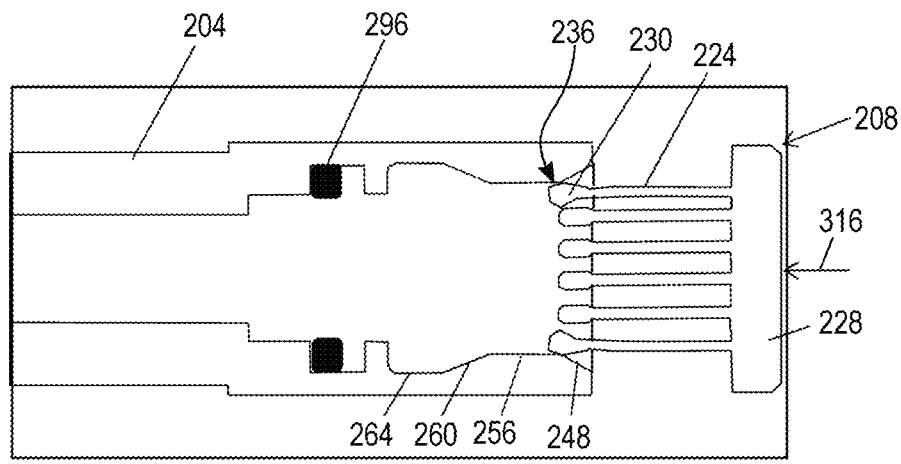
FIG. 6 is a cross-sectional view of the quick-connect system of FIG. 2 showing the collet first being inserted into the port.
Figure 7:
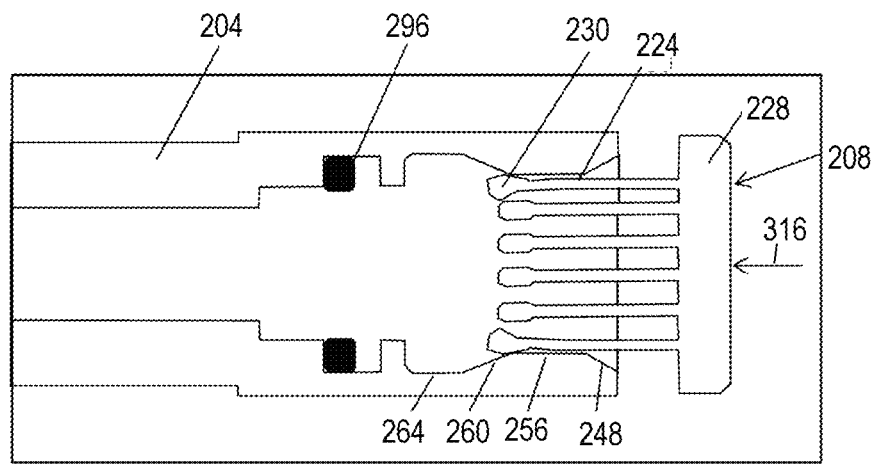
FIG. 7 is a cross-sectional view of the quick-connect system of FIG. 2 showing the collet partially installed in the port.
Figure 8:
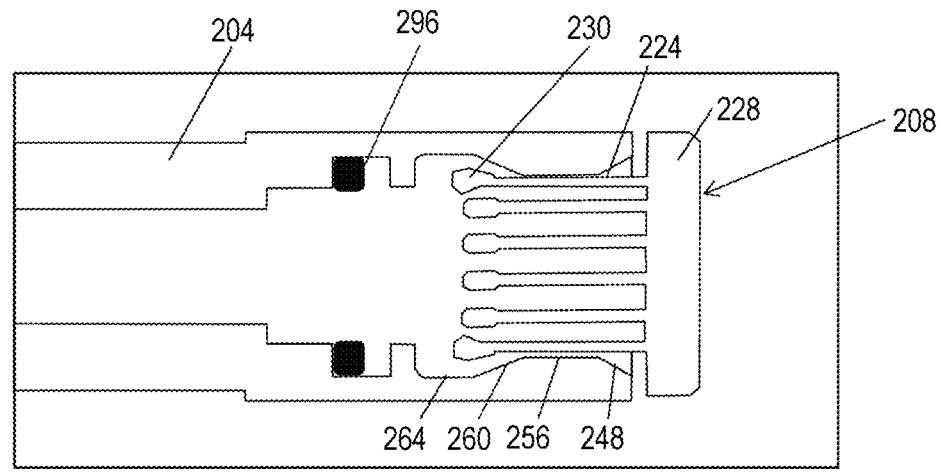
FIG. 8 is a cross-sectional view of the quick-connect system of FIG. 2 showing the collet fully installed in the port.

Operation of the quick-connect system 200 is discussed with reference to FIGS. 4-12. First, the collet 208 is installed by forcing the legs 224 of the collet 208 into the collet cavity 276, as shown in FIGS. 6-8. As previously mentioned, the diameter defined by the outer surfaces of the feet 230 is greater than the diameter of the first through wall portion 256 of the port 204. Thus, with reference to FIG. 6, as the feet 230 are initially inserted, a sufficient force must be applied to the head 228 of the collet 208 in the direction indicated by arrow 316 to cause the inwardly sloping surface 236 of the feet 230 to cooperate with the sloped wall portion 248 of the inner surface 244 to force the legs 224 to flex radially inwardly, thereby providing enough clearance for the feet 230 to enter the passage 216 of the port 204 at the first through wall portion 256.

As illustrated in FIG. 7, continued application of a force to the head 228 in the direction indicated by arrow 316 results in longitudinal translation of the collet 208 rearward as the legs 224 remain flexed, and the outer surfaces of the feet 230 remain in contact with first through wall portion 256. Once the collet 208 is pushed far enough so that the feet 230 enter the open space defined by the sloped interior wall portion 260 and the second through wall section 264, as illustrated in FIG. 8, the legs 224 return to their unflexed position.

Figure 9:
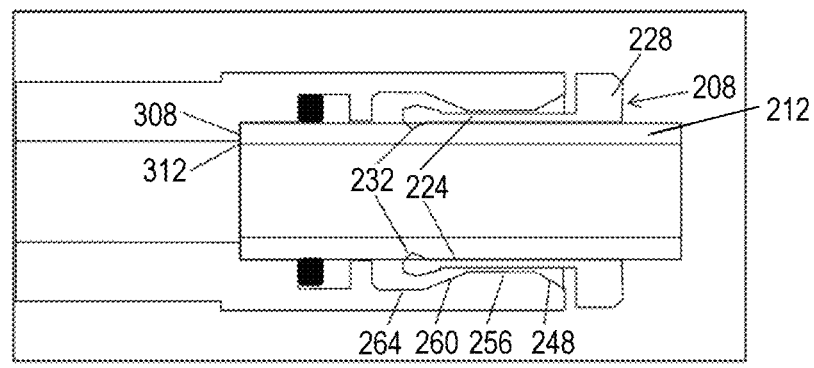
FIG. 9 is a cross-sectional view of the quick-connect system of FIG. 2 showing the tube fully installed into the port in engagement with the collet.
Figure 10:
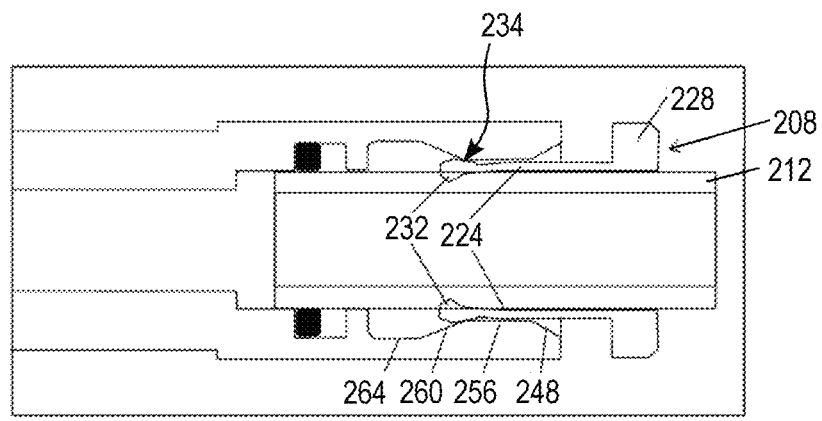
FIG. 10 is a cross-sectional view of the quick-connect system of FIG. 2 showing the tube being pulled from the port with the retaining elements of the collet gripping into the tube.

After the collet 208 is installed, or positioned in a connected state, as seen in FIG. 9, the tube 212 is inserted into the passage 216 of the port 204 until the end face 312 of the tube 212 engages the tube stop face 308. The sealing element 296 forms a tight seal between the outer surface of the tube 212 and the inner wall 244 of the port 204 at the outer face 288. The retaining elements 232 of the collet 208 are forced into contact with the outer surface of the tube 212. In some embodiments, the outermost retaining elements 232 define a diameter less than the outer diameter of the tube 212. As the tube 212 is inserted into the port 204, the engagement of the outer diameter of the tube 212 with the retaining elements 232 causes the legs 224 of the collet 208 to flex, which in turn causes interference between the retaining elements 232 and the angled surface 260 of the port 204. This interference, illustrated in FIG. 10, causes the retaining elements 232 to apply a force radially inward on the tube 212 to hold the tube 212 in place when axial force is applied to the tube 168.

The quick-connect system 200 prevents unwanted release of the tube 212 from the port 204. When the system is in the position of FIG. 10, if the tube 212 is pulled away from the port 204, the outer surface of the feet 230, specifically the outwardly sloping surface 234, cooperates with the sloped portion 260 of the inner wall 244 to flex the legs 224 of the collet 208 radially inwardly, increasing the holding force applied by the retaining elements 232 acting radially inwardly on the tube 212. As the force urging the tube 212 from the port 204 increases, the gripping force provided on the tube 212 by the retaining elements 232 also increases due to the radially inwardly acting force exerted by the sloped portion 260 on the retaining elements 232. As a result, the retaining elements 232 prevent removal of the tube 212 from the port 204 due to forces urging the tube 212 away from the port 204.

The collet 208 is designed such that the flex of the legs 224 causes the retaining elements 232 to apply a desired holding force on the tube 212. In some embodiments, the materials and shape or size of the tube 212 and the collet 208 are selected such that the retaining elements 232 dig into, or slightly deform, the outer surface of the tube 212 in order to retain the tube 212 in place when the tube 212 is urged out from the port 204. In other embodiments, the desired holding force is achieved without deformation of the outer surface of the tube 212.

Figure 11:
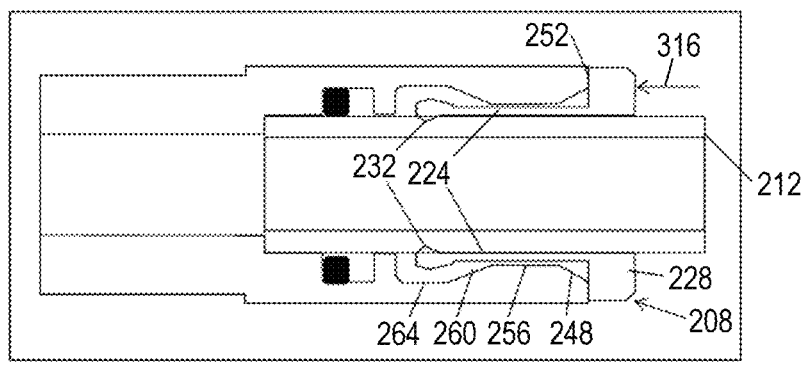
FIG. 11 is a cross-sectional view of the quick-connect system of FIG. 2 showing the collet being pressed flush against the inlet face of the port in order to release the tube.
Figure 12:
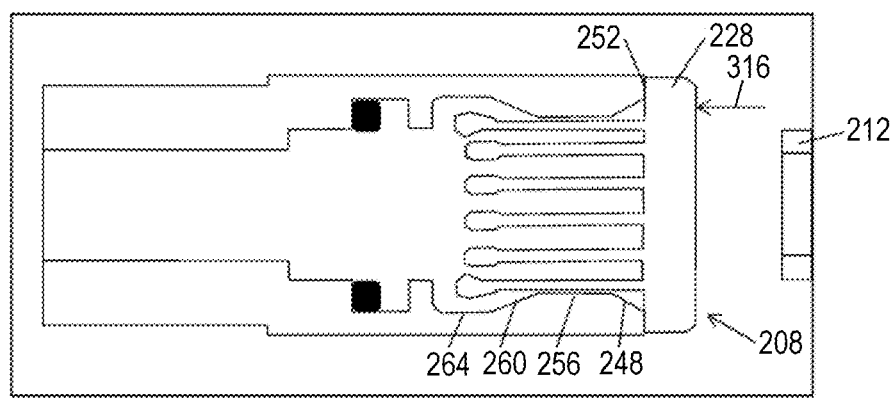
FIG. 12 is a cross-sectional view of the quick-connect system of FIG. 2 showing the tube being released from the port.

Turning to FIG. 11, to release the tube 212 from the port 204, the head 228 of the collet 208 is pressed into the port 204, in the direction indicated by arrow 316, until the head is flush against the inlet face 252, thereby positioning the feet 230 within the open space of the collet cavity 276 defined between the outer surface of the tube 212 and the second through wall section 264, out of contact with the sloped interior wall portion 260. Additionally, in some embodiments, pushing the collet 208 inwardly results in the retaining elements 232 of the feet 230 disengaging from indentations formed in the tube 212 by the retaining elements 232. With the head 228 held flush against the inlet face 252, the tube 212 may be pulled out of the passage 216 of the port 204 without having the feet 230 contacting the sloped interior wall portion 260. With the feet 230 out of contact of the sloped interior wall portion 260, the legs 224 cannot flex inwardly to apply any additional holding force to the tube 212. As a result, the tube can be completely removed, as shown in FIG. 12.

Returning to FIG. 4, with the tube 212 fully installed in the port 204, a fluid connection is established between the tube 212 and the through portion 304 of the port 204. Due to the pressure of the fluid, some fluid may enter the space between the exterior surface of the tube 212 and the rear portion 300 of the port 212. However, the sealing element 292 forms a fluid tight seal between the outer surface of the tube 212 and the outer face 288 of the port 204, preventing flow of pressurized fluid in a direction towards the inlet face 252 past the sealing element 296.

Unlike conventional quick-connect designs that fail under high-pressure, the quick-connect system 200 is rated for high-pressure, including pressures exceeding 2500 psi, due to, at least in part, the projection 268 located between the sealing element 296 and the collet 208. The projection 268 isolates the sealing element 296 from the collet cavity 276. In contrast to conventional designs, the projection 268 acts as a barrier that, even under high-pressure, prevents the sealing element 296 from being urged by pressurized fluid towards the collet 208. As a result, the sealing element 296 is not forced into contact with the collet 208 because. If the sealing element 296 is pushed or deformed by the pressurized fluid, the sealing element 296 is pressed harmlessly against the projection 268. Not only does this arrangement prevent the sealing element 296 from being damaged by the collet 208, but the collet 208 is also prevented from buckling because the sealing element 296 cannot be forced into contact with the collet 208. Consequently, even in high pressure applications, the quick-connect system 200 of the present disclosure retains the tube 212 securely in the manifold block 220.

Figure 13:
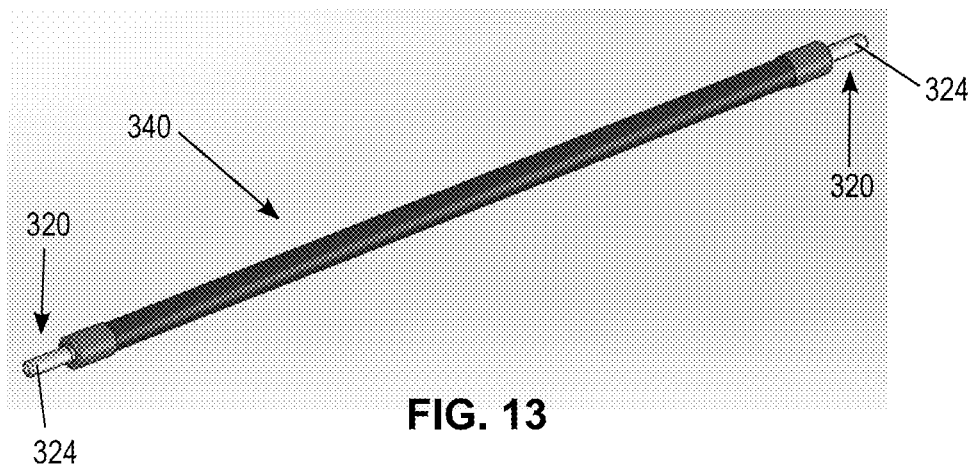
FIG. 13 is a perspective view of a tube having a barbed end fitting that is securable to the port of the quick-connect system of FIG. 2.
Figure 14:
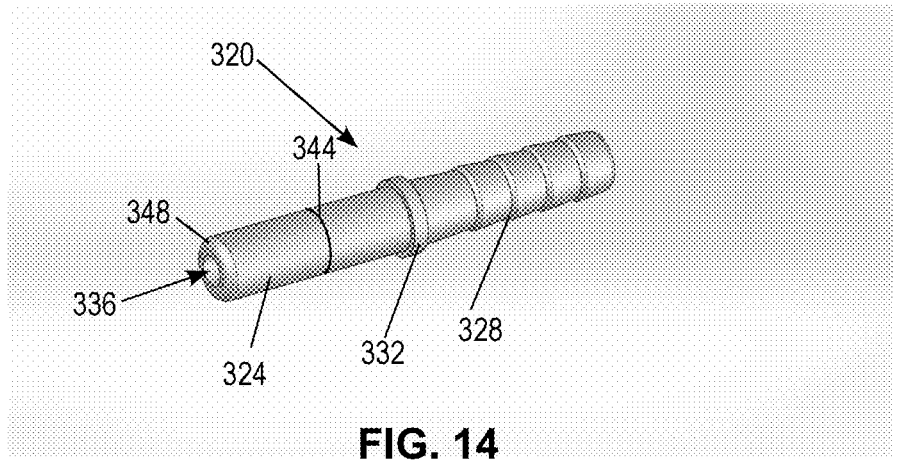
FIG. 14 is a perspective view of the barbed end fitting of FIG. 11.

In the embodiment shown in FIGS. 4-12, the tube 212 is embodied as a cut end of a copper tube, and lacks any additional fitting. However, other tubes and fittings may be secured by the port 204, including end fittings such as barbed end fittings made of brass or other materials, plastic tubes or hoses, steel tubes, metal tubes, rubber tubes or hoses, or any other desired tube, hose or fitting. In one embodiment, illustrated in FIGS. 13 and 14, the tube 212 is a brass barbed end fitting 320. As shown in FIG. 14, the end fitting 320 includes an insertion region 324 and a barbed region 328 separated by a ring 332. A passage 336 is defined through the length of the fitting 320. The barbed region 328 is configured to retain the tube or hose 340 (shown in FIG. 13). The insertion region further includes a notch 344 and a chamfered end 348 for easy insertion into the port 204.

In some embodiments in which the tube 212 is too hard for the retaining elements 232 to dig into, for example in the brass barbed end fitting 320, the tube 212 includes a notch, for example notch 344, in which the retaining elements 232 are seated when the tube 212 or end fitting 320 is installed. When the insertion portion 324 of the end fitting 320 is inserted into the port 204, the retaining elements 232 grip into the notch 344 or overlap the notch 344 to hold the fitting in place. In yet other embodiments, instead of a notch 344, end fitting 320 includes a ring or other retaining structure protruding from the surface to cooperate with the retaining elements 232.

The quick-connect system of the present disclosure provides many benefits over prior quick-connect fittings. Specifically, the system 200 can be used in high-pressure applications without experiencing failure due to the pressure in the system forcing the tube to disconnect. Embodiments of the quick-connect system of the disclosure prevent failure of the sealing element and collet, and unwanted tube removal that results from prior designs in high-pressure applications.

Furthermore, the quick-connect system 200 substantially reduces assembly time of high-pressure RRR refrigerant service carts and ACS systems by reducing the time required to connect the tubes and/or hoses to the manifold block and various other components. While each female nut and mating female fitting connection in conventional ACS systems could require in excess of fifteen seconds to assemble, the quick-connect system 200 reduces the assembly time to two seconds or less. Furthermore, during service of the ACS systems, the tubes can be easily removed and quickly reinstalled, reducing the time required to maintain the ACS systems.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A quick-connect system comprising:
   a port defining an inlet opening at an outer longitudinal end of the port and including an inner wall having a first sloped surface at least partially defining a collet cavity, the first sloped surface having a first diameter at a first end nearest the inlet opening and a second diameter, which is greater than the first diameter, at a second end opposite the first end, wherein the port includes a wall projection projecting radially inwardly from the inner wall, the wall projection including a front face partially defining the collet cavity and a rear face partially defining a seal cavity;
   a collet including a head portion and a plurality of legs extending distally from the head portion, each leg of the plurality of legs including a distal foot portion; and
   a sealing element positioned in the seal cavity and configured to seal between the inner wall and a tube positioned in the port, the sealing element separated from the collet cavity by the wall projection, wherein, in a connected state, the foot portions of the plurality of legs are located in the collet cavity, and the foot portions define an outermost diameter that is greater than the first diameter, and wherein, in the connected state, only the plurality of legs and a portion of the tube are located in the collet cavity.

2. The quick-connect system of claim 1, wherein a maximum width of the foot portion of each leg in a radial direction is greater than a minimum distance between an outer diameter of the tube and the first end of the first sloped portion.

3. The quick-connect system of claim 1, wherein the foot portion of each leg includes a retaining projection configured to engage the portion of the tube positioned in the collet cavity.

4. The quick-connect system of claim 3, wherein:
the foot portion of each leg includes a first foot sloping surface which slopes outwardly from a distal portion of the first foot sloping surface to a proximal portion of the first foot sloping surface, and
the first foot sloping surface is configured to engage the first sloped surface as the collet is moved longitudinally outwardly from the connected state so as to urge the retaining projection of each leg radially inwardly.

5. The quick-connect system of claim 4, wherein the inner wall further comprises a second sloped surface extending from the outer longitudinal end of the port toward the first sloped surface, and a first cylindrical portion extending longitudinally from the second sloped surface to the first end of the first sloped surface.

6. The quick-connect system of claim 5, wherein:
the foot portion of each leg includes a second foot sloping surface which slopes inwardly from a distal portion of the second foot sloping surface to a proximal portion of the second foot sloping surface, and
the second foot sloping surface cooperates with the second sloped surface of the inner wall when the collet is inserted into the inlet opening so as to deform the plurality of legs radially inwardly.

7. The quick-connect system of claim 1, wherein the wall projection has an inner diameter that substantially corresponds to an outer diameter of the tube.

8. The quick-connect system of claim 7, wherein the port includes a tube stop face longitudinally inwardly of the sealing element and configured to engage a terminal end face of the tube.

9. An air conditioning service system comprising:
a manifold block including a port defining an inlet opening at an outer longitudinal end of the port and including an inner wall having a first sloped surface at least partially defining a collet cavity, the first sloped surface having a first diameter at a first end nearest the inlet opening and a second diameter, which is greater than the first diameter, at a second end opposite the first end, wherein the port includes a wall projection projecting radially inwardly from the inner wall, the wall projection including a front face partially defining the collet cavity and a rear face partially defining a seal cavity;
a collet including a head portion and a plurality of legs extending distally from the head portion, each leg of the plurality of legs including a distal foot portion;
a tube inserted in the collet cavity and connected to the port of the manifold block; and
a sealing element positioned in the seal cavity and configured to seal between the inner wall and a tube positioned in the port, the sealing element separated from the collet cavity by the wall projection;

wherein, in a connected state, the foot portions of the plurality of legs are located in the collet cavity, and the foot portions define an outermost diameter that is greater than the first diameter, and wherein only the plurality of legs and a portion of the tube are located in the collet cavity.

10. The air conditioning service system of claim 9, wherein a maximum width of the foot portion of each leg in a radial direction is greater than a minimum distance between an outer diameter of the tube and the first end of the first sloped portion.

11. The air conditioning service system of claim 9, wherein the foot portion of each leg includes a retaining projection configured to engage the portion of the tube positioned in the collet cavity.

12. The air conditioning service system of claim 11, wherein:
the foot portion of each leg includes a first foot sloping surface which slopes outwardly from a distal portion of the first foot sloping surface to a proximal portion of the first foot sloping surface, and
the first foot sloping surface is configured to engage the first sloped surface as the collet is moved longitudinally outwardly from the connected state so as to urge the retaining projection of each leg radially inwardly.

13. The air conditioning service system of claim 9, wherein the wall projection has an inner diameter that substantially corresponds to an outer diameter of the tube.

14. An air conditioning service system comprising:
a manifold block; and
a tube connected to the manifold block via a quick-connect system comprising:
a port defining an inlet opening at an outer longitudinal end of the port and including an inner wall having a first sloped surface at least partially defining a collet cavity, the first sloped surface having a first diameter at a first end nearest the inlet opening and a second diameter, which is greater than the first diameter, at a second end opposite the first end, wherein the port includes a wall projection projecting radially inwardly from the inner wall, the wall projection including a front face partially defining the collet cavity and a rear face partially defining a seal cavity;
a collet including a head portion and a plurality of legs extending distally from the head portion, each leg of the plurality of legs including a distal foot portion; and
a sealing element positioned in the seal cavity and configured to seal between the inner wall and the tube, the sealing element separated from the collet cavity by the wall projection, wherein the foot portions of the plurality of legs are located in the collet cavity, and the foot portions define an outermost diameter that is greater than the first diameter, and wherein only the plurality of legs and a portion of the tube are located in the collet cavity.

15. The air conditioning service system of claim 14, wherein a maximum width of the foot portion of each leg in a radial direction is greater than a minimum distance between an outer diameter of the tube and the first end of the first sloped portion.

16. The air conditioning service system of claim 14, wherein:

the foot portion of each leg includes a retaining projection configured to engage the tube and a first foot sloping surface which slopes outwardly from a distal portion of the first foot sloping surface to a proximal portion of the first foot sloping surface, and the first foot sloping surface is configured to engage the first sloped surface as the collet is moved longitudinally outwardly from the connected state so as to urge the retaining projection of each leg radially inwardly.

17. The air conditioning service system of claim 14, wherein the projection has an inner diameter that substantially corresponds to an outer diameter of the tube.

\* \* \* \* \*